United States Patent [19]

Hicks et al.

[11] 4,086,896
[45] May 2, 1978

[54] THROTTLE STRUCTURE FOR IMPARTING SUPERSONIC CHARACTERISTICS IN THE INTAKE MANIFOLD OF AN INTERNAL COMBUSTION ENGINE

[75] Inventors: Donald L. Hicks; Richard D. Doerr, both of St. Louis, Mo.

[73] Assignee: ACF Industries, Inc., New York, N.Y.

[21] Appl. No.: 727,718

[22] Filed: Sep. 29, 1976

[51] Int. Cl.² .............................................. F02M 31/00
[52] U.S. Cl. ...................... 123/122 AC; 123/122 AB; 261/65
[58] Field of Search .................. 123/122 AC, 122 AB, 123/122 AA, 141; 261/65

[56] References Cited

U.S. PATENT DOCUMENTS

| 1,676,955 | 7/1928 | Kemp | 123/122 AC |
| 4,008,699 | 2/1977 | Braun | 123/122 AB |

FOREIGN PATENT DOCUMENTS

| 498,706 | 9/1954 | Italy | 261/65 |

*Primary Examiner*—Ronald H. Lazarus
*Attorney, Agent, or Firm*—Edward H. Casey

[57] ABSTRACT

A combustible mixture of air and minute fuel droplets is produced for supply to the cylinders of an internal combustion engine. The engine includes a carburetor having a main air passageway in it, and an intake manifold interposed between the engine and the carburetor. The intake manifold includes at least one wall defining a plurality of fluid passageways operatively connected to the carburetor and to the combustion chambers of the engine. A throttle structure is mounted in the intake manifold. The combustible mixture is formed by introducing liquid fuel into a stream of intake air and uniformly distributing the fuel in the air by passing the air and fuel mixture through a constriction to increase the velocity of the mixture to sonic speed. The constriction occurs at the throttle structure in the manifold. The area of the constriction and the amount of fuel entering the air stream are adjustable for correlation with engine demand. After passing through the constriction, the air/fuel mixture is accelerated to supersonic velocity and thereafter decelerated to subsonic velocity to produce a shock zone where the fuel droplets are believed to be further subdivided. The supersonic and subsonic mixture speeds are obtained at the outlet of the throttle structure in the manifold. Thereafter, the mixture is inducted into the combustion chambers of the engine. Preferably, the throttle structure includes a cylinder movably mounted in the intake manifold. A plate either is suspended in or forms a part of the intake manifold. The plate and cylinder coact to provide the constriction, supersonic and subsonic zones of the mixture flow. Means are provided on the cylinder for delimiting those zones of mixture flow.

12 Claims, 9 Drawing Figures

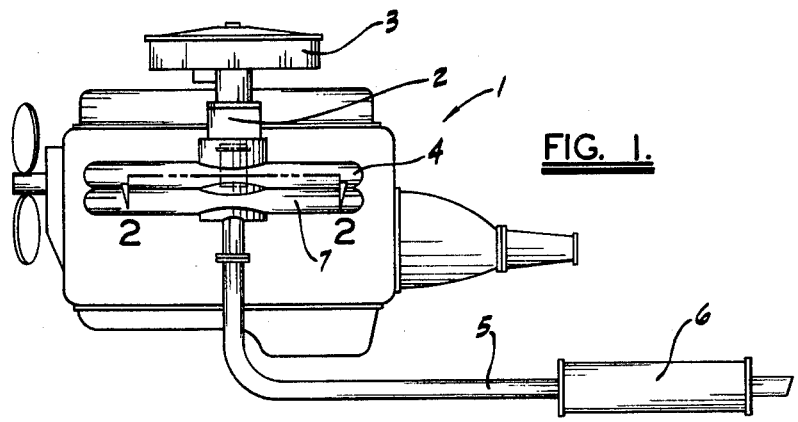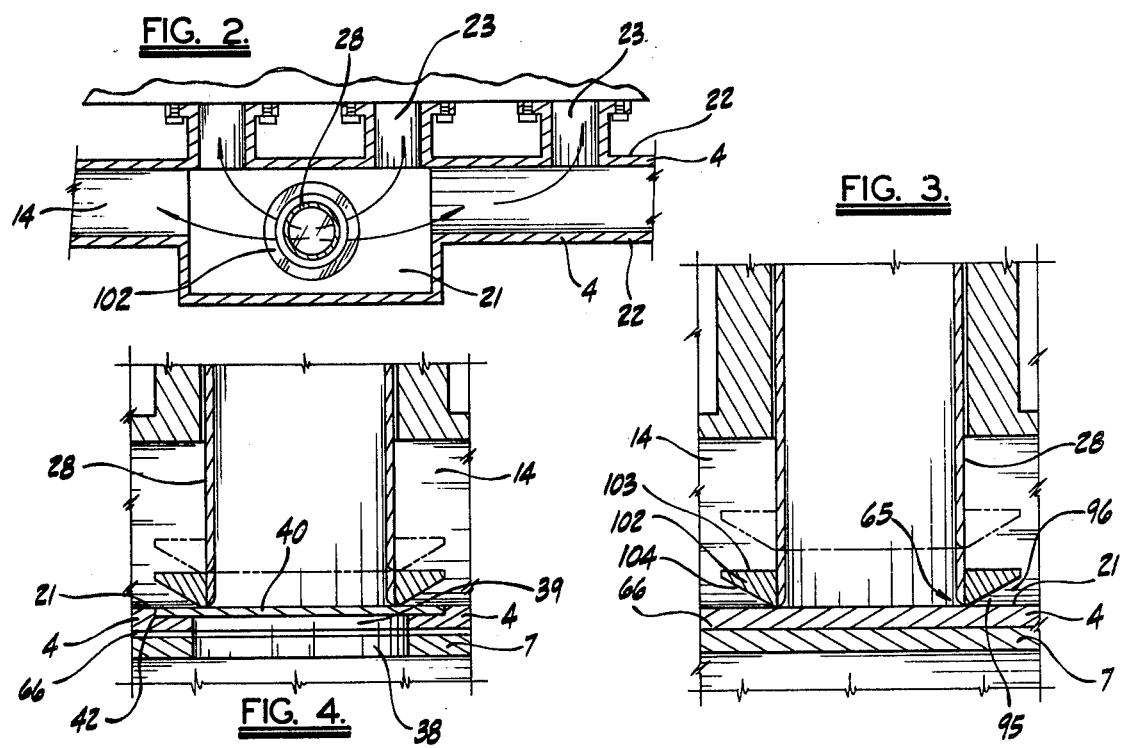

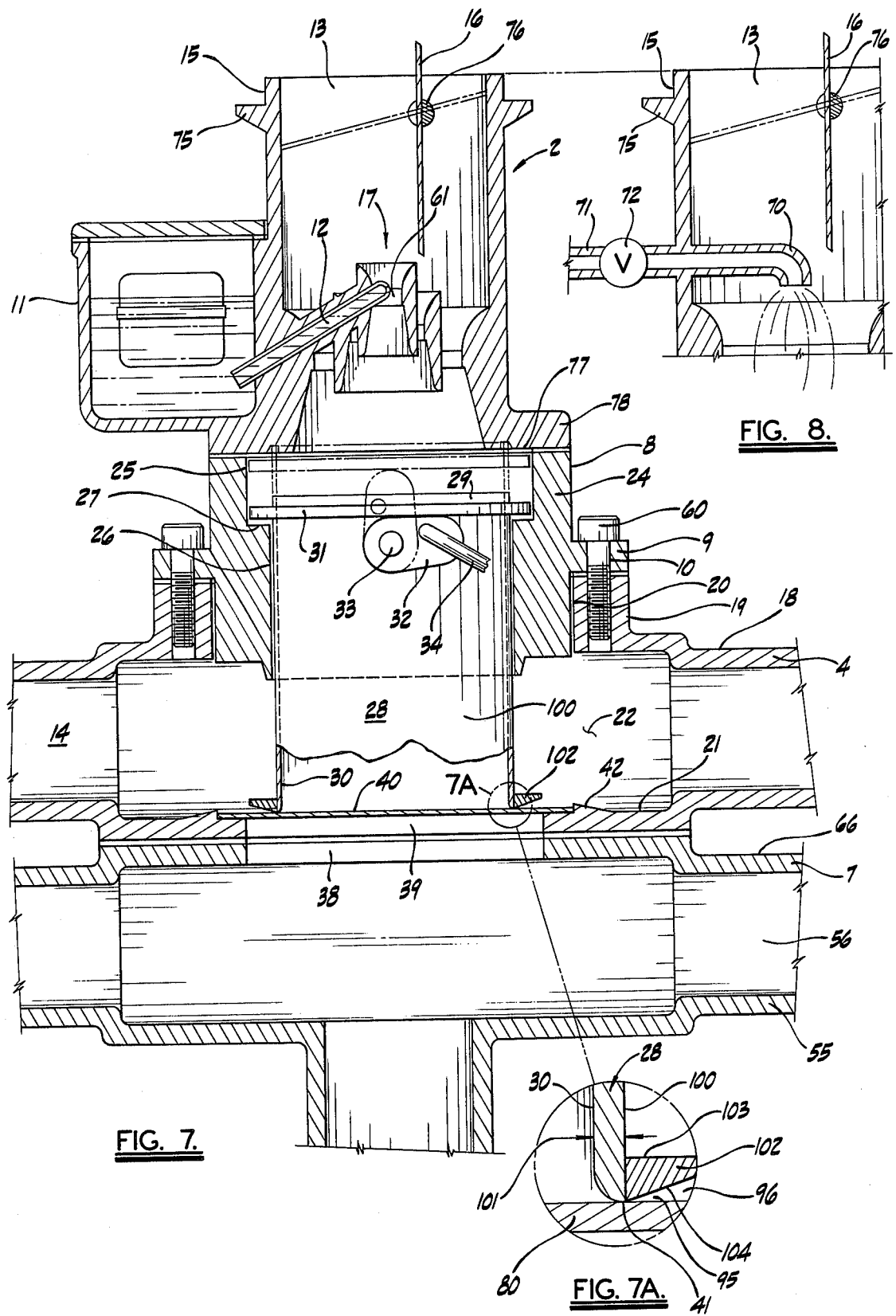

THROTTLE STRUCTURE FOR IMPARTING SUPERSONIC CHARACTERISTICS IN THE INTAKE MANIFOLD OF AN INTERNAL COMBUSTION ENGINE

BACKGROUND OF THE INVENTION

This invention relates to internal combustion engines, and in particular, to an improved throttle structure for controlling the passage of fuel to the combustion chambers of the engine, and for mixing and modulating liquid fuel and intake air in order to reduce undesirable exhaust emissions from such engines.

In combustion engines prevalent today, the combustion chambers of the engine are connected to a source of fuel and a source of air through an intake manifold and a carburetor. The carburetor has a main air passageway extending through it, and a venturi restriction is used to draw fuel into the air stream. Control of the flow through the passageway is obtained through the use of a throttle valve. Throttle valves used in the prior art conventionally have been a butterfly valve-type device.

It long has been known that the combustion chambers of an engine receive varying amounts of fuel during operation of the engine. Ideally, each intake stroke of the piston should draw a fuel-air mixture into a particular combustion chamber which would burn completely during the power stroke of the piston. Unfortunately, fuel/air distribution does not match the ideal. The reasons for unequal distribution also generally are known. Thus, when the fuel/air mixture strikes a conventional throttle valve, large droplets of fuel often are formed. Large fuel droplets do not move readily through the intake manifold to the combustion chambers, and distort the fuel/air ratio when they do arrive. In addition, the throttle valve commonly is pivotally mounted across the diameter of the carburetor passage. Fuel/air movement past the throttle is unbalanced or directed toward one side or the other of the passageway by the very presence of the throttle valve. Although some mixing of the two air streams imposed by the throttle valve does occur below the throttle valve, the assymetrical distribution of the fuel and the intake air rarely is overcome completely.

A number of attempts have been made to improve the consistency of the air/fuel mixture delivered to the cylinders of internal combustion engines. In general, prior art attempts involve complicated redesigns of the fuel/air delivery system, for example, by the use of fuel injection mechanisms, or complicated redesigns of the engine. While such systems and designs work for their intended purposes, they are expensive to produce initially and often are expensive to maintain in normal operation and use.

An example of an improved throttle structure with which the invention disclosed hereinafter is compatible is disclosed in a co-pending application by James T. Bickhaus, "Throttle Structure for an Internal Combustion Engine," Ser. No. 727,713, filed 9/29/76. An invention dealing with subject matter related to that described herein is described in a co-pending application by Edward H. Casey, "Means for Imparting Supersonic Flow Characteristics in the Intake Manifold of an Internal Combustion Engine," Ser. No. 727,719, filed 9/29/76. Both applications are assigned to the assignee of the present invention. Information disclosed in these co-pending applications is intended to be incorporated by reference.

The invention disclosed herein provides an improved throttle means for a conventional carburetor, which accomplishes sonic flow with simplified structure. As described more fully hereinafter, the incoming fuel and air mixture, in one embodiment of the invention, is permitted to strike the bottom wall of the intake manifold of the engine. A throttle means, which generally is similar to that described in the above-referenced Bickhaus application, Ser. No. 727,713, filed 9/29/76, as modified by this invention, is utilized to regulate engine demand with fluid flow. The throttle means and intake manifold are arranged so that fluid flow through the throttle passes through a restriction for obtaining sonic flow, and a diverging portion which imparts supersonic and then subsonic flow to the mixture.

Devices and methods for obtaining supersonic flow in internal combustion engines also are known in the art. For example, the Eversole, U.S. Pat. No. 3,778,038, issued Dec. 11, 1973, describes a particular approach to obtaining supersonic flow in the intake supply system of an engine.

In distinction to prior art designs, this invention accomplishes supersonic flow with little modification either to the conventional carburetor structure or to the conventional intake manifold.

One of the objects of this invention is to provide a throttle structure for an internal combustion engine which gives better fuel/air mixture distribution to the cylinders of the engine.

Another object of this invention is to provide a throttle valve structure having an inlet side and an outlet side, the outlet side being positioned in the inlet manifold of an internal combustion engine.

Another object of this invention is to provide a throttle valve structure which utilizes a tubular body member as the valve element.

Another object of this invention is to provide a throttle valve structure which imparts supersonic flow to the fuel mixture passing through it.

Yet another object of this invention is to provide a throttle structure imparting supersonic flow characteristics to the fluid mixture passing through it without requiring major design changes in either the carburetor or the intake manifold of the engine.

Still another object of this invention is to provide a cylindrical throttle valve structure having an end modified to provide sonic flow to a fuel/air mixture.

Other objects of this invention will be apparent to those skilled in the art in light of the following description and accompanying drawings.

SUMMARY OF THE INVENTION

In accordance with this invention, generally stated, an internal combustion engine having an intake manifold operatively connected to the combustion chambers of the engine, and a carburetor operatively connected to the intake manifold, is provided with a throttle structure having an inlet and an outlet, the outlet being positioned within the intake manifold. In the preferred embodiment, the throttle structure includes a movably mounted tubular member. The end of the tubular member within the intake manifold has means for at least partially delimiting both a convergence and a divergence mounted to it. The end of the tubular member within the intake manifold, together with the wall defining the passageway of the intake manifold, totally define a converging section terminated in a restriction, followed by a diverging section opening into the main flow passageway of the intake manifold. Fluid enters the tubular structure from the carburetor and is directed against the bottom wall of the intake manifold. The fluid, after striking the bottom wall of the intake manifold, may proceed radially outwardly in all directions in a much more even flow pattern than possible with prior art throttle valves. As the fluid flow moves radially outwardly, it passes through the restriction defined by the end of the tubular structure. Thereafter, the flow enters the diverging section to produce a shock zone, which is believed to break up any large particles of fluid in the mixture, in turn permitting a more even flow distribution to the combustion chambers of the engine.

BRIEF DESCRIPTION OF THE DRAWINGS

In the drawings,

FIG. 1 is a view in side elevation, partly broken away, of an internal combustion engine utilizing a carburetor employing a throttle structure of this invention;

FIG. 2 is a sectional view, partly broken away, taken along the line 2—2 of FIG. 1;

FIG. 3 is a sectional view, partly broken away, of one illustrative embodiment of throttle structure used in conjunction with the engine of FIG. 1;

FIG. 4 is a sectional view, partly broken away, of a second illustrative embodiment of throttle structure of this invention;

FIG. 5 is a sectional view partly broken away, of a third illustrative embodiment of throttle structure of this invention;

FIG. 6 is a sectional view, partly broken away, of a fourth illustrative embodiment of throttle structure of this invention;

FIG. 7 is an enlarged sectional view, partly broken away, of a carburetor employing a fifth illustrative embodiment of throttle structure of this invention;

FIG. 7a is an enlarged view taken about the area 7a of FIG. 7; and

FIG. 8 is a sectional view, partly broken away, showing a second illustrative fuel supply system for the carburetor shown in FIG. 7.

DESCRIPTION OF THE PREFERRED EMBODIMENT

Referring now to FIG. 1, reference numeral 1 indicates an internal combustion engine, including a carburetor 2 connected to a source of air through an air cleaner 3. The carburetor 2 also is operatively connected to the combustion chambers of the engine 1 through an intake manifold 4, while exhaust gas from the combustion chambers of the engine are connected to a tailpipe 5 and a muffler 6 through an exhaust manifold 7.

The conventional portion of the caburetor 2 structure not forming a part of this invention is best illustrated in FIG. 7, where it may be observed that the carburetor 2 incudes a housing 8 having a flange 9 extending outwardly from it. The flange 9 is provided with suitable openings 10 for mounting the housing 8 to the intake manifold 4 with conventional threaded fasteners 60 inserted in corresponding openings in the intake manifold 4. A main air passage 13 extends through the housing 8 and communicates with a distribution passage 14 in the intake manifold 4. The carburetor 2 also has a fuel bowl 11 associated with it, which is operatively connected to the main air passage 13 along a main fuel passageway 12. The upper portion of the carburetor 2 defines an air horn 15. Air horn 15 commonly includes a flange 75 for receiving the air cleaner 3, shown in FIG. 1. Those skilled in the art will recognize that various structural features of the carburetor 2 may be formed integrally with one another or they may be constructed independently and interconnected by any convenient method.

A conventional butterfly choke valve 16 is pivotally mounted in the passage 13 at 76, upstream of a venturi section 17. The valve 16 operates to control the amount of air entering the passage 13 during various operating conditions of the engine 1. The operation and structure of the choke valve 16 is conventional and, consequently, it is not described in detail.

As indicated, the passageway 12 extends between the fuel bowl 11 and the passage 13, communicating with the passage 13 at the venturi passage 17. Venturi section 17 also is conventional, and is not described in detail. In general, a restriction 61, provided at the venturi section 17, causes a pressure drop to exist within the venturi section which enables the air rushing through the passageway 13 to draw fuel from the fuel bowl 11 via the passageway 12.

Intake manifold 4 generally includes a top wall 18 having an annular rim 19 integrally formed with it. The rim 19 defines an opening 20 in the top wall 18 which permits communication between the carburetor passage 13 and the manifold distribution passage 14. Intake manifold 4 also includes a bottom wall 21 and a pair of side walls 22. The top wall 18, bottom wall 21 and side walls 22 define a plurality of inlet ports 23, best seen in FIG. 2, communicating with the combustion chambers of the engine. For drawing simplicity, the combustion chambers themselves are not shown. While the manifold 4 is illustratively described as having top, bottom and side walls, those skilled in the art will recognize that often a manifold is cylindrical in design, and in reality a single, continuous wall may be utilized in place of the walls set out alone. The designations for top, bottom and side walls, however, facilitates disclosure of this invention.

In prior art internal combustion engines, a throttle valve, usually of a butterfly design, was positioned downstream with the venturi section 17 and upstream of the opening 20 in the manifold 4. The valve acted to control the fuel/air mixture flow through the passage 14 and the ports 23. As indicated above, distribution of the fuel/air mixture has not been optimized in prior art designs. To overcome this deficiency, the throttle valve of this invention modifies the housing 8 of the carburetor 2 structure so that a lower portion 24 has a first, large diameter part 25 and a second, small diameter part 26 along the opening 13 of the housing 8. The lower portion 24 itself is sized for reception in the opening 20, through the top wall 18 of the manifold 4. The diametric differences between the parts 25 and 26 delimit a stop 27, the stop 27 being useful for purposes later described.

A cylinder 28 is slidably mounted within the small diameter part of the lower portion 24. Cylinder 28 has a first end 29 and a second end 30. The end 29 has a flange 31 formed in it, which is sized to ride in the large diameter part 25 of the housing 8. The flange 31 acts to locate the cylinder 28 during cylinder movement. Together with the stop 27 and a stop defined by a wall 77 of an upper housing portion 78, the flange 31 and end 29 act to confine movement of the cylinder 28 to prescribed limits. In the embodiment illustrated, cylinder 28 is a right circular cylinder, although other cylindrical forms or tubular means are compatible with this invention.

Thus, other applications may require different cross sectional shapes to effect distribution of the fluid mixture to the engine cylinders. As will be appreciated by those skilled in the art, an "in-line" engine, as shown in FIG. 1, has its carburetor on one side of the manifold 4 with all of the runners to the individual combustion chambers extending from the other side of the manifold. On the other hand, a manifold for a "V-type" engine has the carburetor mounted in a central location with runners extending along oppositely opposed directions from the carburetor location. Design of the tubular member may require modification to provide proper fluid distribution while accommodating carburetor location.

A cam means 32 is pivotally mounted at 33 and is adapted to rotate in response to movement of an arm 34. Cam 32 abuts a lower side of the flange 31, lower being referenced to FIG. 7. The arm 34 is operatively connected to a throttle command means, not shown, which may be, for example, the accelerator pedal of a conventional passenger vehicle. Engagement of the flange 31 by the cam means 32 during rotation thereof causes the cylinder 28 to move between a first position shown in full lines in FIGS. 3–7, and a second position, shown in phantom lines in FIGS. 3–7.

The structure just described is common to the various embodiments shown in FIGS. 3–7, and to the above-referenced copending applications by Bickhaus and Casey, Ser. No. 727,713, and Ser. No. 727,719, respectively. Specific structure is utilized to accomplish the objectives of this invention, which structure is described in greater detail in conjunction with the various drawing figures. Thus, for example, a side wall 100 of the cylinder 28 has a thickness 101, best seen in FIG. 7a. The thickness 101 is formed or beveled at 80 to delimit a point of maximum restriction 41 along the end 30 of the cylinder 28.

The end 30 also has a lip 102 integrally formed along an outboard side of the wall 100, which extends radially outwardly from it. The lip 102 has a generally annular and planar top wall 103 and a preformed, angled bottom wall 104.

The cylinder 28 has an axial length chosen so that the cylinder extends into and is capable of abutting the bottom wall 21 of the intake manifold 4. The bottom wall 21 may be machined, if desired, to ensure proper abuttment of the end 30 with the bottom wall. As observable in FIG. 3, the wall 104, together with the bottom wall 21 of the intake manifold 4, define a supersonic flow area 95 and a subsonic flow area 96. The relative position of the end 30 of the cylinder 28 with the bottom wall 21 defines a throttle valve 65 for the carburetor 2. As shown in FIG. 3, the end 30 of the cylinder 28, closes against the bottom wall 21 and movement of the cylinder 28 away and toward the wall 21 controls valve operation. The relative location of the supersonic areas may vary in embodiments of this invention. That is to say, the angle chosen for the wall 104, along with movement of the cylinder 28, may vary the location of the supersonic and subsonic areas with respect to one another.

As best observed in FIG. 2, use of the cylinder 28 permits fuel and air passing through the carburetor 2 to strike the bottom wall 21, and to expand radially outwardly through the supersonic flow area 95 and the subsonic flow area 96. As shown and described, fuel flow to the manifold 4 necessarily passes through a constriction or convergence, and thereafter passes through a divergence in the areas 95 and 96. This arrangement has offered considerably better fuel distribution to the inlet ports 23 of the manifold 4 than available with prior art throttle valves.

As exemplified, in the drawings, often the exhaust manifold 7 is adjacent the intake manifold 4. The thickness of the material used for the walls of the exhaust and intake manifolds may be varied to provide more efficient heat transfer between the manifolds. Heat from the exhaust manifold 7 tends to vaporize liquid gasoline in the fuel and air mixture, and the liquid vaporization aids in the ability of the carburetor 2 and throttle valve 65 of this invention to improve fuel/air distribution to the ports 23 of the manifold 4.

Exhaust manifold 7 is conventional and includes a top wall 66, a bottom wall 55 and a pair of sides 56. The tailpipe 5 and muffler 6 are attached to the exhaust manifold 7 by any convenient method.

FIGS. 4, 5 and 7 illustrate variations of methods and structure for providing heat transfer between the exhaust and intake manifolds. As shown in FIG. 4, exhaust manifold 7 has an opening 38 formed in it. In addition, the intake manifold 4 has an opening 39 formed in the bottom wall 21, the opening 39 being axially aligned with the opening 38. The opening 39, however, is closed by a plate 40 which prevents direct communication between the intake and exhaust manifolds. Plate 40 may be press-fit within the opening 39 or staked in position as indicated at 42 in FIG. 7. The plate 40, being symmetrical with the air passage 13, enables the throttle valve 65 to maintain the radial flow characteristics of the fuel/air mixture after that mixture strikes the plate 40.

The design of the plate 40 may vary in other embodiments of this invention. For example, FIG. 5 illustrates a plate 111 having a circular top wall 115 generally corresponding to the diameter of the cylinder 28. An angled wall 116 extends between the top wall 15 and a generally vertical side 117. The wall 116 and the wall 104 of the lip 102 define the supersonic area 95 and the subsonic area 96 in the embodiment of FIG. 5. The increased area provided by the plate 11 construction increases heat transfer efficiency between the exhaust and intake manifolds, ensuring a higher vaporization ratio of liquid fuel in the fuel/air mixture. It should be noted that the plate 111, being symmetrical with the pair passage 13, enables the throttle valve 65 to maintain the radial flow characteristics of the fuel/air mixture after that mixture strikes the plate 111. Another advantage of the embodiment of FIG. 5 is that the fuel/air mixture flow enters the distribution passage 14 of the intake manifold along a central portion of the passage. The entrance of the fuel/air mixture in this location also is believed to improve fluid distribution to the ports 23.

The embodiments of the throttle valve 65 described heretofore require some modification in existing intake manifolds for their implementation, although that modification is considerably less than experiences with previously known prior art devices which attempt to improve the fuel/air mixture delivery of a carburetor. FIG. 6 illustrates a throttle valve 90 which may be used directly with presently available intake manifolds. Like numerals have been utilized for like parts, where appropriate. In the embodiment of FIG. 6, a drop-in structure 48 includes an annular flange 49. The flange 49 has a central opening 68 in it, the opening 68 being axially aligned and communicating with the passage 13. The flange 49 also has a plurality of openings 50 in it, which receive the conventional fasteners 60 to mount the flange 49 between the housing 8 and the rim 19 of the intake manifold 4. A plurality of studs 52 are attached to the flange 49 and extend downwardly from it, so that the studs 52 project into the distribution passage 14 of the intake manifold 4. A plate 53 is attached to the studs 52 by any convenient method. For example, the studs 52 may be press-fit or threaded onto the plate 53. The plate 53 and the end 30 of the cylinder 28 define the throttle valve 90 for the embodiment of FIG. 6. The advantage of this embodiment is that an entire throttle valve package may be attached to the carburetor structure 2 and inserted in the intake manifold 4, without further modification to the intake manifold. The plate 53 is constructed so as to provide the sonic flow area 95 and subsonic flow area 96, similar to that described in conjunction with the valve 65 of FIGS. 3, 4, 5 and 7. Operation of the throttle valve 90 is similar to that described for the valve 65.

Numerous variations, within the scope of the appended claims, will be apparent to those skilled in the art in light of the foregoing description and accompanying drawings. Thus, while the throttle valves 65 and 90 were described as including a cylinder 28, other geometric bodies are compatible with the broader aspects of this invention. The important consideration is that the valve action of the throttles 65 and 90 occur within the intake manifold 4, and that the throttle valve 65 provides supersonic and sonic flow to the fuel/air mixture prior to that mixture's entrance into the cylinders of the engine 1. Likewise, various conventional structural features described in conjunction with the carburetor 2 may vary in other embodiments of this invention. For example, it is conventional to utilize a plurality of venturi sections in some carburetor designs. In like manner, independent idle fuel circuit supply means may be incorporated in the carburetor 2 design. Presently, however, idle fuel supply is obtained by proper positioning of the cylinder 28. The carburetor structure as described herein utilizes a conventional venturi section 17 and air passage 13 to draw fuel into air passing through the venturi section. Those skilled in the art will recognize that the venturi section 17 may be replaced by a nozzle 70 connected to a source of fuel by a conduit 71. Such an arrangement is shown in FIG. 8. The conduit 71 is provided with pressure means to pump fuel under pressure into the passage 13 in accordance with the load demand of the engine as controlled by a valve 72. It thus is apparent that the throttle valve of this invention is compatible with a broad range of fuel supply means. These variations are merely illustrative.

Having thus described the invention, what is claimed and desired to be secured by Letters Patent is:

1. A fuel supply system for an internal combustion engine, comprising:
    an intake manifold for distributing a fluid to the engine, said intake manifold having an enclosure, said enclosure including at least one wall defining a fluid passage in said manifold;
    a carburetor for supplying a fuel/air mixture to said intake manifold, said carburetor having an air passage in it operatively connected to said intake manifold, fuel supply means connected to said air passage, and means for mixing fuel and air in said air passage upstream of said intake manifold; and
    throttle valve means for controlling the fluid flow through said intake manifold mounted in said intake manifold, said throttle valve means comprising a tubular element movable between at least a first position and a second position in said intake manifold, said tubular element having a side wall, said side wall having a material thickness, said side wall further delimiting an opening connecting the intake manifold and the air passage, said tubular element having a first end in said carburetor, and a second end in said intake manifold, the material thickness of said side wall having a chamfer formed in it along the second end of the tubular element, and a lip extending outwardly from the second end of said tubular element, said lip having an annular upper wall and an angled lower wall, the chamfer along said material thickness and said lower angled wall defining a convergence, a point of maximum convergence, and a diverging section for fluid flow in said intake manifold.

2. The fuel supply system of claim 1 wherein the wall of said intake manifold has an opening formed in it, said opening being axially aligned with the air passage in said carburetor, further including a plate mounted in said opening and adapted to close said opening, and an exhaust manifold, said plate being in heat conductive relationship with said exhaust manifold.

3. The system of claim 2 wherein said plate extends radially inwardly of said intake manifold.

4. The fuel supply system of claim 1 wherein said throttle valve means comprises a drop-in structure attached to said carburetor and positioned in said intake manifold, said drop-in structure including a floor plate, and means for attaching said floor plate to said carburetor, said floor plate being spaced from said intake manifold, said floor plate and said tubular element defining the convergence, point of maximum convergence and diverging section in said intake manifold.

5. A system for supplying a uniform combustible mixture of liquid fuel and air to the intake ports of an internal combustion engine, comprising:
    an intake manifold for connecting the system to the intake ports of the engine, said intake manifold having a passage through it;
    means for supplying a fuel/air mixture to said intake manifold, said supply means having an air passage in it communicating with the passage in said intake manifold;
    means for supplying liquid fuel to the air passage of said fuel/air mixture supply means, said liquid fuel supply means being operatively connected to the air passage; and
    throttle valve means including a tubular element having an inlet in the air passage of said fuel/air supply means downstream of the connection between said fuel supply means and said air passage and an outlet in the passage of said inlet manifold upstream of the intake ports of the internal combustion engine, said tubular element being movably mounted and adapted to abut a part internal of said intake manifold in a first position, and to be remote from said part in a second position, said tubular element including a side wall having a material thickness, said tubular element delimiting an opening connecting the intake manifold and the air passage, said tubular element having a first end and a second end, the second end of said tubular element having a lip extending outwardly from it, said lip having at least one angled wall for defining, with the material thickness of said side wall, a restriction at a point of maximum convergence, said angled wall further defining a diverging section downstream of the restriction, said tubular element creating a sonic wave in the fluid flow of said intake manifold in at least one position of said tubular element.

6. The system of claim 5 wherein said intake manifold includes a bottom wall having a material thickness, said bottom wall having an opening in it, the opening being axially aligned with the air passage of said fuel/air mixture supply means, and a plate mounted to said intake manifold and closing said opening, said plate having a material thickness less than the material thickness of said bottom wall.

7. The system of claim 6 wherein said plate extends inwardly of said intake manifold.

8. The system of claim 7 wherein the second end of said tubular element has a flange extending radially outwardly from said tubular element.

9. The system of claim 8 wherein said tubular element is a right circular cylinder.

10. A system for supplying a uniform combustible mixture of liquid fuel and air to the intake ports of an internal combustion engine, comprising:
   an intake manifold connected to the intake ports of said engine, said intake manifold including a wall defining at least one passageway through said intake manifold;
   means for supplying a fuel/air mixture to said intake manifold, said fuel/air mixture supply means having an air passage in it communicating with the passage in said intake manifold;
   means for supplying liquid fuel to said fuel/air mixture supply means operatively connected to the air passage of said last-mentioned supply means; and
   valve means having an inlet in the air passage of said fuel/air mixture supply means downstream of the connection between said liquid fuel supply means and said air passage, said valve means having an outlet in the passage of said inlet manifold upstream of the intake ports of the internal combustion engine, said valve comprising a tubular element mounted for movement between a first position where said tubular element abuts a part internal of said intake manifold, and a second position where said tubular element is remote from said part, said tubular element including a side wall defining an opening, said opening being connected between said air passage and the passage through said intake passage, said side wall having a first end and a second end, the tubular element having a lip extending outwardly from said side wall along the second end thereof, said lip having at least one angled wall, said angled wall and said tubular element defining a converging section, a restriction at the point of maximum convergence, and a diverging section downstream of said restriction, said lip acting to create a sonic wave in the fluid flow in said intake manifold.

11. The system of claim 10 wherein said tubular element comprises a right circular cylinder.

12. The system of claim 10 wherein the side wall of said tubular element has a material thickness, said material thickness being formed to define said restriction.

* * * * *